March 28, 1950     G. J. OLNEY     2,501,909
TROUGH FOR VEGETABLE SEPARATORS
Filed March 5, 1947     3 Sheets-Sheet 1

Inventor
George J. Olney
By Thomas L. Wilder
Attorney

March 28, 1950     G. J. OLNEY     2,501,909
TROUGH FOR VEGETABLE SEPARATORS

Filed March 5, 1947     3 Sheets-Sheet 2

Inventor
George J. Olney
By Thomas L. Wilder
Attorney

March 28, 1950 G. J. OLNEY 2,501,909
TROUGH FOR VEGETABLE SEPARATORS
Filed March 5, 1947 3 Sheets-Sheet 3

Inventor
George J. Olney
By Thomas L. Wilder
Attorney

Patented Mar. 28, 1950

2,501,909

UNITED STATES PATENT OFFICE 2,501,909

TROUGH FOR VEGETABLE SEPARATORS

George J. Olney, Westernville, N. Y.

Application March 5, 1947, Serial No. 732,422

2 Claims. (Cl. 209—173)

1

My invention relates to a trough for a vegetable separator and I declare the following to be a full, clear, concise and exact description thereof sufficient to enable anyone skilled in the art to which it appertains to make and use the same, reference being had to the drawings in which like reference characters refer to like parts throughout the specification.

Heretofore, trouble has been experienced when the feed of the peas from the hopper to the conveying trough was not evenly distributed throughout the breadth thereof or when the feed of the peas approaches the limit of capacity of the machine. In either of these events the peas tend to dam up on one side of the trough, while the flow is increased correspondingly on the opposite side of the trough.

To overcome this difficulty, the trough has been divided into separate channels by partition plates as heretofore. The plates, however, in this instance have been extended back and to the rear of the hopper and by erecting a semi-dam just to the rear of the extended partition plates which abut thereagainst. The partition plates extend lengthwise of the trough from the semi-dam a certain distance along the trough to cover the initial separating zone of the peas.

In order to prevent the whirlpool and undercurrents that are usual when a liquid is allowed to flow over an obstruction into a liquid on a lower level, which whirlpools and undercurrents cause the peas to be retarded instead of being carried quickly through the machine, there is disposed on the top edge of the semi-dam an auxiliary adjustable member having plates with angled parts permanently secured to the top edge thereof. Each of said plates is disposed centrally of each channel and occupies about two-thirds of the width of each of the channels, one of which plates is disposed to cooperate with each of the several channels of the conveying trough.

It has been found by actual experiment that the auxiliary adjustable cam with bent plates will eliminate eddies, whirlpools and currents in the channels, whereas just a plain upstanding dam causes the same that seriously interferes with the proper separation of vegetables passing through the machine.

The object will be understood by referring to the drawings in which

2

Figure 5:
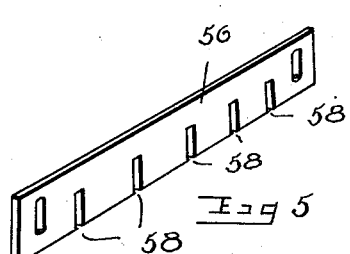
Figure 4:
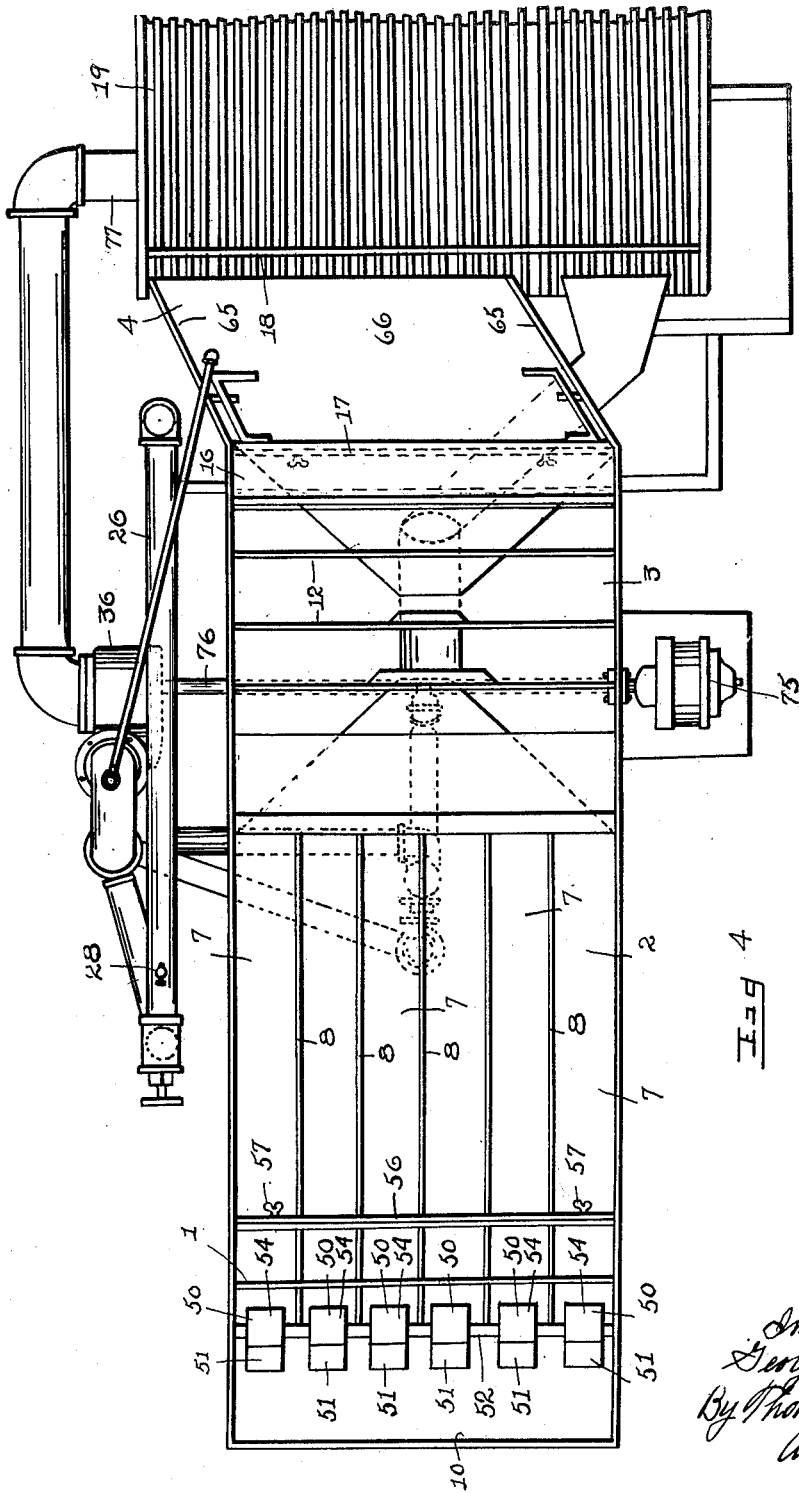
Fig. 4 is a plan view of the machine, parts being broken away.

Fig. 5 is a detail view showing a perspective of an adjustable gate employed.

Referring more particularly to the drawings, the parts that are old and shown in Patent No. 2,262,465 embody the hopper 1 for feeding the peas to the trough 2 where they are carried forwards by a flowing brine solution towards the separating tank 3 and ultimately towards the delivery chute 4.

The bottom 5 of the trough 2 forms the top surface of the main supply tank 6 filled with the conveying solution or brine which carries the peas through said machine. Said trough 2 is divided into channels 7 by partition plates 8 hereinafter mentioned.

The left hand end of bottom 5 is bent downward at right angles at 9 and spaced from wall 10 of tank 6 to allow for an outlet passageway for the flow of the solution from tank 6 through and along channels 7 of trough 2. There is also the wedge shaped divider 11, baffle plates 12, stop gate 16, adjustable gate 17 to determine the level of the brine in the separating zone, whereby to separate the grade of peas, baffle 18 near the upper end of screen or grid 19, basket 20 having its bottom perforated at 21, a receiver tank 22, drain pipe 23 emptying into liquid receiving tank 22, pipe 25 extending downwardly into tank 22 which is connected at its upper end to horizontally disposed pipe 26 connected to vertically disposed pipe 27, the former having a petcock 28 to break the siphoning action through pipe 26 and the latter having a valve 29, pipes 30 and 31 which latter is connected to vertically disposed pipe 32 through means of elbow 33, to return bend 34 to vertically disposed pipe 35 to pump 36 to pipe 37 to receiving tank 22, there is also the connecting pipes 40 having valve 41 therein that joins pipe 32 with the ejector pipe 42 opening into the rear of trough 43, whereby to direct a current of water therethrough. Pipes 45 and 46 connect pipe 32 to a supply tank 6, aforementioned.

The novel features are hereinbelow described and contemplate making plates 50 with an inclined surface 51. Said plates 50 are mounted in a permanent manner by welding or otherwise to an adjustable U-shaped member 52 and normal thereto. Member 52 is removably mounted to a dam 53. Said dam 53 is disposed transversely across trough 2 in an upright manner upstream and adjacent the location of the hopper 1. Dam 53 with its adjustable member 52 thereon partially obstruct the flow of the conveying liquid which, otherwise, would cause whirlpools on the front or forward side thereof were it not for the inclined surfaces 51 of plates 50 mounted on said adjustable member 52. The sides of member 52 have a tight fitting sliding action with respect to the sides of dam 53, whereby member 52 can be held at any predetermined height relative to dam 53. Said plates 50 are in width about two-thirds the distance between channels 7. The horizontal parts 54 of said plates 50 are located preferably just below the upper edges of partition plates 8 and extend downstream beyond said dam 53 into each of said channels 7. Inclined surfaces 50 of each of said plates extend upstream from said dam 53.

The dotted line 55 indicates the approximate level of the solution used to carry the peas through the machine. The solution level to the rear or left of hopper 1 is slightly higher than that to the right thereof. This is caused partially by the resistance offered by the peas passing from hopper 1 to trough 2 and by the vertically adjustable gate 56 which is attached to the front side of hopper 1 by winged nuts 57 engaging hopper 1 and an elongated slot in gate 56.

Gate 56 has vertical slots 58 formed therein to straddle partition plates 8 disposed in parallel relation to each other and longitudinally of channel or trough 2. Said partition plates 8 are welded to the bottom surface 5 of trough 2 and divide said trough 2 into separate channels 7, whereby the peas will be more evenly distributed throughout the breadth of said trough 2.

The means for compensating for the retarding effect of the angularly disposed lateral walls 65, 65 of channel 66 of the conveying liquid anticipates an abrupt fall or drop of the conveying liquid at 67, whereby to speed up the flow of the conveying liquid in this location in proportion as it is retarded by the walls 65, 65. The fall is effected by providing a bottom surface 70 disposed on an incline and having an angled part 71 attached to the vertical wall 72 of the separating tank 3. The bottom surface extends from said wall 72 to the screen 19 of the delivery chute 4.

Figure 1:
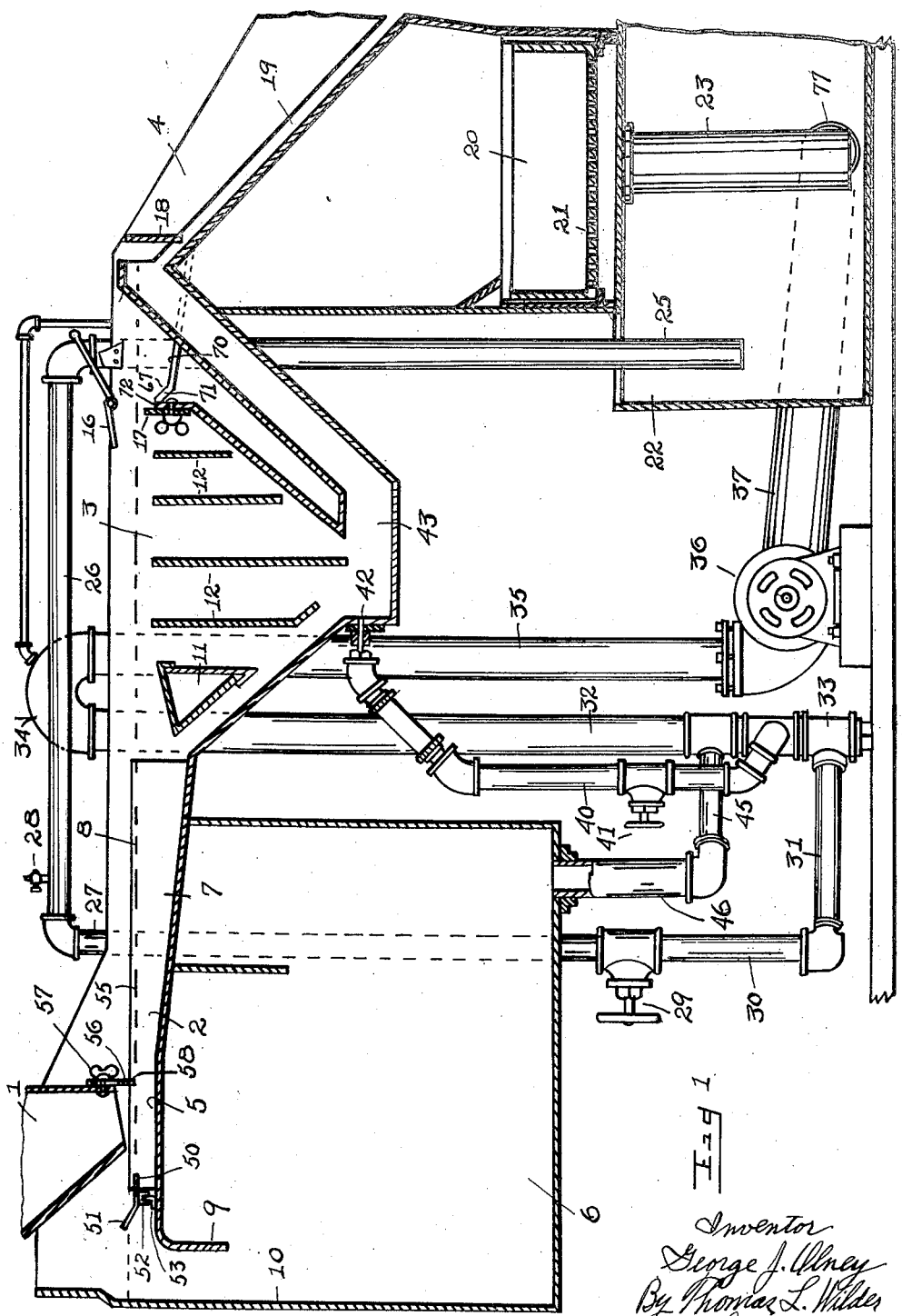
Fig. 1 is a vertical longitudinal section of the machine, parts being broken away.

In operation the brine solution is started flowing from tank 6 to the right through channels 7 of trough 2 by starting pump 36 to force the carrying solution through the machine. The water or solution level will rise to the dotted line shown in Fig. 1. Peas of various grades are dumped into hopper 1 and fall by gravity into the separate channels 7 of trough 2, where they are carried swiftly through the machine. As the solution passes from tank 6 into trough 2 it will be retarded partially by semi-dam 53 and rise thereabove to flow therepast as shown by the arrows in Fig. 2. The inclined surfaces 51 of plates 50 will retard the flow sufficiently to prevent eddies or undertow forming in front of dam 53 or in any part of channels 7 of trough 2. There is effected thus an even flow of the solution to carry the peas swiftly toward the separating chamber or tank 3 where they are graded according to quality. The drop at 67 of bottom surface 70 will tend to speed up the passage of the conveying liquid sufficiently to compensate for the retarding effect of the angularity of the walls 65, 65 in channel 66.

Figure 2:
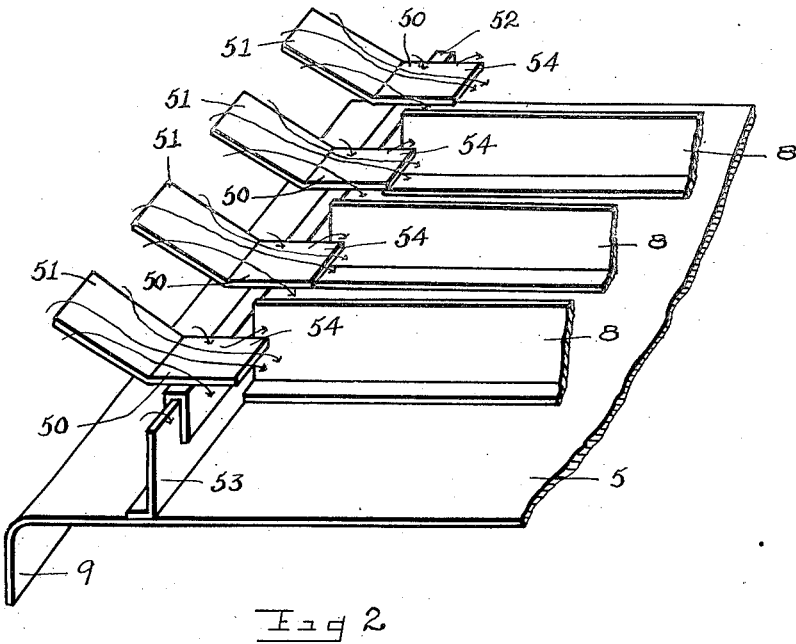
Fig. 2 is a detailed view enlarged showing a perspective of the dam and contiguous parts employed in the machine, parts being broken away.
Figure 3:
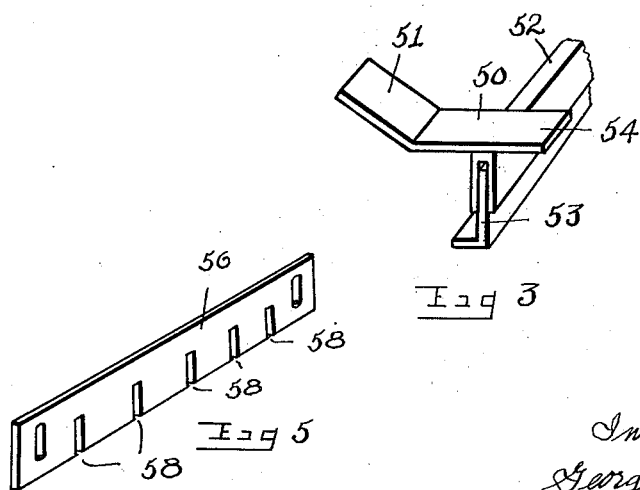
Fig. 3 is a detailed enlarged view of a removable member having angled plates mounted thereon that is employed in the machine.

This is explained more particularly by the fact that plates 50 span only part of the width between partition plates 8 and, therefore, leave a space in either side thereof, about half the water passing through each of the chambers 7 will drop directly downward over the semi dam 53 and is free then to flow from both sides under the plates 50 as shown by arrows in Fig. 2 and then continues directly ahead in line with the slow flow coming off the edge of plates 50 which are extended beyond dam 53. This prevents an undertow and allows the flow to continue directly ahead in line with the slow flow coming off the edge of plates 50.

The current has a slight flow over the top back of inclined surfaces 51 which is retarded by the current flowing in from both sides of surfaces 51 and of plates 50. The opposition of these three currents over the back and over the sides effects the slowing down of the resultant current, whereby to create less agitation and undertow at the location of the front surface of dam 53. This resultant current will cause the peas to move forward at the proper speed, whereby none will be trapped under the plates 50.

Pump 36 is driven by electric motor 75 which is connected thereto by shaft 76. Suction pipe 77 extends to the intake port of pump 36.

Having thus described my invention what I claim as new and desire to secure by Letters Patent is as follows:

1. In a trough for a vegetable separator, a trough having channels formed therein for the passage of a liquid for carrying vegetables, a hopper mounted above said trough for supplying vegetables thereto, a hopper mounted upstream in said trough adjacent said hopper to aid in retarding the flow of the liquid through said channels, removable plates mounted on said dam and normal thereto, each of said plates having a surface inclined upwardly from said dam and extending upstream therefrom, each of said plates also having a horizontal part extending downstream from said dam into one of said channels, whereby to effect a slow flow of the water coming off said horizontal parts, said inclined surfaces of said plates allowing for a slight flow of water thereover, and said plates being mounted at spaced intervals to each other on said dam and centrally of each of said channels to allow the current of water to flow over the sides of said plates, whereby to prevent an undertow of water at said dam.

2. In a trough for a vegetable separator, a trough having channels formed therein for the passage of a liquid for carrying vegetables, a hopper mounted above said trough for supplying vegetables thereto, a dam mounted upstream in said trough adjacent said hopper to aid in retarding the flow of the liquid through said channels, a removable U-shaped member mounted on said dam, plates mounted on said U-shaped member and normal thereto, each of said plates being of less width than said channels and having horizontal surfaces extending downstream from said dam into each of said channels, said plates also having surfaces inclined upwardly from said dam and extending upstream therefrom and said plates being mounted at spaced intervals to each other on said U-shaped member and centrally of each of said channels, whereby to allow the current of water to flow over the sides of said plates to prevent an undertow of water at said dam.

GEORGE J. OLNEY.

REFERENCES CITED

The following references are of record in the file of this patent:

UNITED STATES PATENTS

| Number | Name | Date |
| --- | --- | --- |
| 2,198,390 | Olney | Apr. 23, 1940 |
| 2,262,465 | Olney | Nov. 11, 1941 |